Oct. 27, 1959    C. H. JUDISCH    2,909,990
MARKING VULCANIZED RUBBER CORDAGE AND THE LIKE
Filed Nov. 23, 1955    2 Sheets-Sheet 1
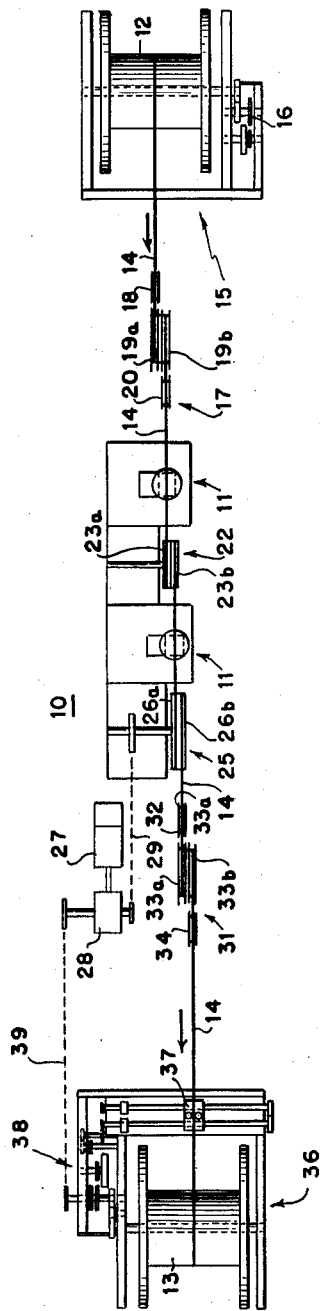
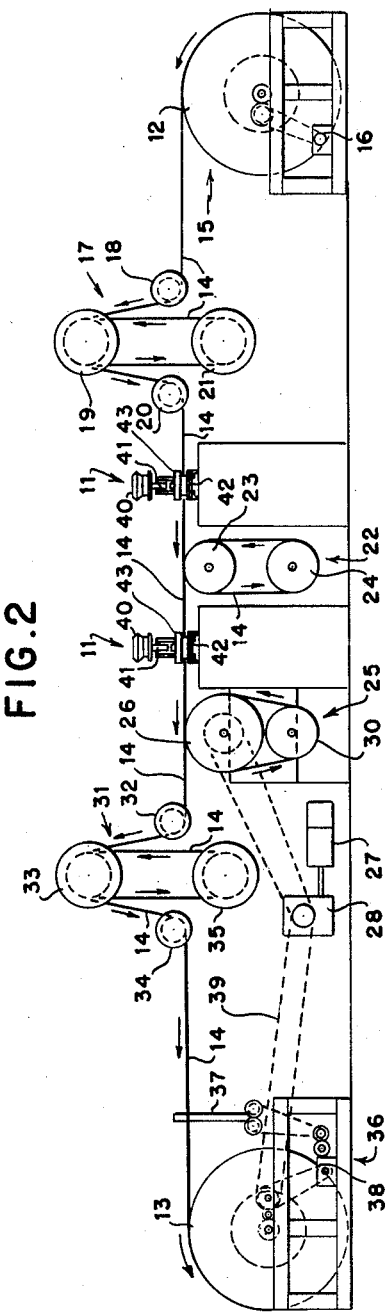
INVENTOR.
Carl H. Judisch
BY
Adams, Forward & McLean
ATTORNEYS Oct. 27, 1959     C. H. JUDISCH     2,909,990
MARKING VULCANIZED RUBBER CORDAGE AND THE LIKE Filed Nov. 23, 1955     2 Sheets-Sheet 2

INVENTOR.
Carl H. Judisch
BY
Adams, Forward & McLean
ATTORNEYS

United States Patent Office 2,909,990
Patented Oct. 27, 1959

2,909,990

MARKING VULCANIZED RUBBER CORDAGE AND THE LIKE

Carl H. Judisch, Hamden, Conn., assignor to The Whitney Blake Company, New Haven, Conn., a corporation of Connecticut Application November 23, 1955, Serial No. 548,564

2 Claims. (Cl. 101—32)

My invention relates to marking resilient bodies and in particular provides a method and apparatus for impressing indicia in relief on the surface of materials such as vulcanized natural and synthetic rubbers and other cured thermosetting compositions.

Vulcanized natural and synthetic rubbers and other resilient cured thermosetting materials, such as are used as exterior jackets in the fabrication of cordage and in construction of similar articles, are difficult to mark with identifying legends since there are no printing inks known which can be used to mark such surfaces with indicia which are permanent and are not removed by abrasion, scuffing, dirt, water, grease and oil. I am aware that heretofore such surfaces have been marked by applying a patch of unvulcanized material to which suitable indicia are applied in relief by means of heated dies which simultaneously vulcanize the patch. This manner of marking is, however, cumbersome and expensive. I am also aware that thermoplastic materials can be marked by using heated dies, for example, in the cordage industry, by passing thermoplastic coated cordage between heated die wheels. This manner of application of indicia to thermoplastic materials is, however, not readily applicable to marking cured thermosetting materials such as vulcanized natural and synthetic rubbers because the heat and time of contact required to leave an impression are also sufficient to burn the surface which is to be marked. In marking cordage such a burned impression dangerously weakens the surface structure which is usually quite thin. The problem of marking vulcanized rubbers and the like is of particular importance in fabrication of articles by processes, such as extrusion, since no mark can be applied during the curing operation as in processes, such as molding.

It is an object of my invention to provide a method and apparatus for marking the surface of resilient materials, such as vulcanized natural and synthetic rubbers and other cured thermosetting materials, by the application of a heated die in a manner which avoids burning and charring of the surface of the material and which provides clear and permanent indicia marked in relief on the surface of the resilient material which cannot be removed by abrasion, scuffing and the like. It is a further object of my invention to provide such a method and process which will have utility in marking cordage, jacketed with vulcanized natural or synthetic rubbers, such as neoprene, and which can be utilized at adequately high rates of speed to keep pace with the customary 100 to 300 feet per minute extruding speed at which such cordage is fabricated.

These and other objects of my invention are accomplished essentially by enclosing the exterior of the resilient body which is adjacent to the portion on which indicia are to be impressed with a rigid mass of heat insulating material and by impressing the indicia on the surface of the body with a heated metal die while the adjacent area of the resilient body is so insulated and shielded.

For a more complete understanding of the application of the principles of my invention to a practical method and apparatus, reference is made to the appended drawings in which:

Fig. 1 is a plan view of an apparatus constructed in accordance with my invention using a tandem press arrangement for marking cordage covered with a jacket of vulcanized neoprene;

Fig. 2 is an elevational view of the apparatus shown in Fig. 1;

Figure 3:
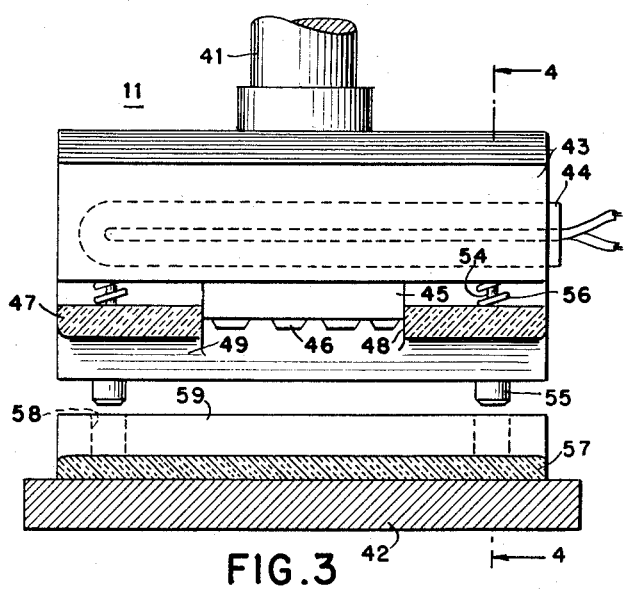
Fig. 3 is a fragmentary elevational view shown partly in section illustrating the open position of one of the presses employed in the apparatus shown in Figs. 1 and 2.

In the drawings, referring particularly to Figs. 1 and 2, the reference numeral 10 designates generally an apparatus for marking cordage 14 having an exterior jacket 14a of a resilient material such as vulcanized neoprene. Marking apparatus 10 comprises a tandem arrangement of a pair of presses 11 through which cordage 14 is passed from a spool 12 to a spool 13.

Spool 12 is mounted on a pay-off assembly 15 having a brake mechanism 16. Cordage 14 as it is drawn from spool 12 passes over a tension tower 17 including fixed sheave 18, fixed double sheave 19, fixed sheave 20 and a spring mounted sheave 21 which is free to move relative to double sheave 19 against spring biasing (not shown). Cordage 14 passes first under sheave 18 over one-half, 19a, of sheave 19, under sheave 21, over the second half, 19b, of sheave 19 and then leaves tension tower 17 passing under sheave 20.

Cordage 14 then passes through the first press 11 into sheave assembly 22 which includes a pair of freely rotating fixed position sheaves 23 and 24. In passing over sheave assembly 22 cordage 14 first passes over one-half, 23a, of sheave 23 which is a double sheave and then under sheave 24 and finally over the second half, 23b, of double sheave 23.

Cordage 14 then passes through the second press 11 and about drive assembly 25. Drive assembly includes a double sheave windlass 26, including a sheave 26a and a sheave 26b which are rotated by brake motor 27 through a reduction gear 28 and chain drive mechanism 29. The drive assembly also includes a single sheave 30 which is freely rotatable about a fixed axle. Cordage 14 passes through drive assembly 25, first passing over sheave 26a of windlass 26, then under sheave 30 and finally over sheave 26b of windlass 26.

Cordage 14 as it leaves drive assembly 25 passes into a second tension tower 31 which includes fixed sheave 32, fixed double sheave 33, fixed sheave 34 and spring mounted sheave 35 which is positioned beneath double sheave 33 and is freely movable toward sheave 33 against spring biasing (not shown). Cordage 14 passes through tension tower 31 first traveling under sheave 32 and over one-half 33a of double sheave 33, then under sheave 35, over the second half 33b of double sheave 33 and finally out under sheave 34.

Finally, cordage 14 is wound upon spool 13 mounted in a take-up assembly 36 which includes a suitable traveling guide mechanism 37 for directing even winding of the cordage upon spool 13. Traveling guide 37 and spool 13 are both operated by a drive mechanism 38 which is powered by motor 27 through reduction gear 28 and a chain drive 39.

Each press 11 includes a hydraulic cylinder 40 reciprocating a piston 41 vertically above a base plate 42.

Figure 4:
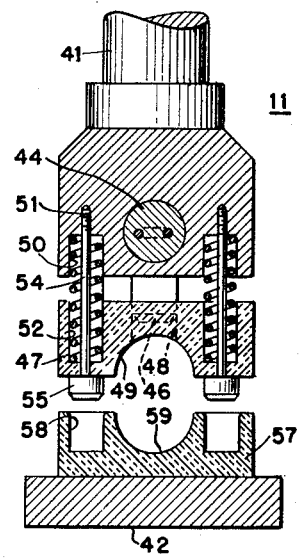
Fig. 4 is a cross-sectional view of the press shown in Fig. 3 taken at line 4—4 in Fig. 3.

Referring more particularly to Figs. 3 and 4 which illustrate the press members of each press 11 in open position, it will be observed that the lower end of piston 41 carries an enlarged platen and die holder 43 which is bored horizontally to receive an electrical resistance-heating element 44. On its underside, platen 43 carries a small metallic die block 45, the undersurface of which is shaped with suitable configurations 46 to impress complementary indicia on a surface on which die 45 is pressed.

Beneath platen 43 is a pressed asbestos block 47 which is centrally apertured vertically at 48 to permit vertical movement of die 45 therethrough. The undersurface of asbestos block 47 has an elongated semi-cylindrical groove 49 extending across its length, aligned with aperture 48. Near each of the four corners of the underside of platen 43, platen 43 is provided with enlarged vertical bores 50 which terminate in small tapped vertical bores 51. These bores 50 are aligned with enlarged vertical bores 52 in the upper surface of pressed asbestos block 47. As they extend through the undersurface of block 47, bores 52 are reduced in diameter at 53.

A bolt 54 having an enlarged head 55 extends upwardly through each aligned group of bores 53, 52, 50 and 51, the upper end of each bolt 54 being threadedly engaged in bore 51 with head 55 supporting block 47. A coil spring 56 which is received at its ends in bores 50 and 52 encloses each bolt 54 under sufficient compression to force block 47 down away from platen 43 when press 11 is open.

Affixed on base plate 42 and aligned beneath pressed asbestos block 47 is a pressed asbestos block 57 which is apertured in its upper surface at its four corners with vertical bores 58 aligned with the heads 55 of bolts 54 such that when piston 41 forces platen 43 and block 47 downwardly, the heads 55 and bolts 54 are received in apertures 58. The upper surface of block 57 is also provided with a semi-cylindrical elongated groove 59 extending the length of block 57 which is aligned with groove 49 in block 47 such that when piston 41 lowers platen 43 and block 47, grooves 49 and 59 define an elongated cylindrical chamber for receiving a length of cordage 14 and into which die configurations 46 project.

In operation a spool 12, carrying cordage 14 having an external sheath of vulcanized neoprene 14a or similar thermosetting material, is positioned on pay-off assembly 15. The free end of cordage 14 is fed through tension tower 17, the first press 11, sheave assembly 22, the second press 11, drive unit 25, tension tower 31 and traveling guide 37 onto an empty spool 13 positioned in take-up assembly 36. The various drives are then actuated and electrical resistance-heaters 44 are turned on. By suitable controls (of conventional arrangement and not shown) motor 27 is alternately operated and braked to pay-off through presses 11 in each operation a length of cordage 14 on which it has been previously ascertained two markings should be impressed. The adjustment of fixed spacing of sheaves 24 and 23 is set to provide the desired spacings of such markings, and control of presses 11 is synchronized with the brake periods of motor 27 to drive pistons 41 down and hold them down an adequate length of time to make the desired impressions.

Figure 5:
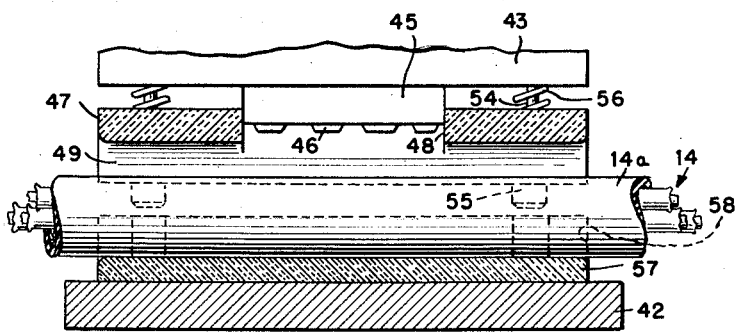
Fig. 5 is a fragmentary view similar to Fig. 3 illustrating the same press in open position with neoprene jacketed cordage in place for marking.
Figure 6:
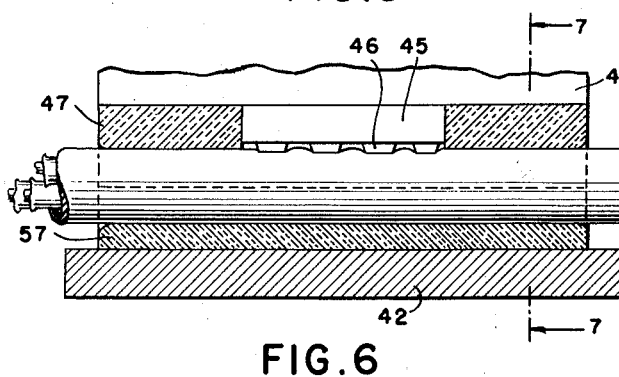
Fig. 6 is a view similar to that of Fig. 5 but illustrating the press in closed position.
Figure 7:
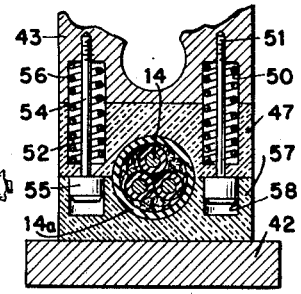
Fig. 7 is a cross-sectional view taken at line 7—7 in Fig. 6.

The operation of presses 11 is illustrated by Figs. 5, 6 and 7. Fig. 5 shows the open press as it is about to close on cordage 14. As press 11 closes, block 47 clamps down on cordage 14 to hold it in place and then die 45 is inserted into aperture 48 to impress the surface of cordage 14 (see Fig. 6). Springs 56, as shown in Fig. 7, compress within bores 50 and 52 to permit platen 43 to bear against block 47. Desirably, compression on blocks 47 and 57 is limited by metal stops (not shown) which limit closure of the press members in a conventional manner.

In the case of vulcanized neoprene-jacketed electrical cable the temperature of die 45 should be 425° F. and presses 11 should be closed for thirty-one seconds in order to obtain the best impression. Lower temperatures and longer times can, of course, be employed, and conversely higher temperatures, up to the decomposition limit, and shorter times can also be employed. With other materials different temperatures and times will be required. Vulcanized natural rubber, for example, can be impressed with best results at temperatures under 300° F.

It will be observed that the successful operation of the press and method of my invention lies in enclosing all the surface area which is adjacent to the surface area to be impressed with a rigid heat insulating material which desirably is kept as cool as possible, such that during the press operation heat transferred from the heated die to the material to be impressed is confined to the immediate area of the impression. The illustrated press 11, which is a preferred construction for carrying out my invention, has the added advantage that as platen 43 is withdrawn from the cordage 14 (see Fig. 5) springs 56 force a separation of block 47 and platen 43 (see Fig. 4), thus reducing the heat carried to insulating block 47 by conduction from platen 43 and permitting air to pass around and cool block 47.

I claim:

1. A method for impressing indicia in relief on the exterior of bodies formed of vulcanized natural and synthetic rubbers and other cured thermosetting materials which comprises tightly enclosing the exterior portion of such a body adjacent to the portion thereof on which said indicia are to be impressed with rigid heat-insulating material thereby to shield such adjacent exterior body portion, and pressing the portion of such body on which said indicia are to be impressed with a heated, metallic element having a configuration contacting said body complementary to the indicia desired to be impressed for a period of time and at an elevated temperature below the decomposition temperature of said body sufficient to impress said indicia permanently in relief on the exterior of said body.

2. A method according to claim 1 in which said body is vulcanized neoprene and in which said period of time and temperature are, respectively, 31 seconds and 425° F.

References Cited in the file of this patent

UNITED STATES PATENTS

| | | |
|---|---|---|
| 764,035 | Brandenburg | July 5, 1904 |
| 1,740,285 | Correll | Dec. 17, 1929 |
| 1,856,319 | Cooper | May 3, 1932 |
| 2,047,373 | Kingsley | July 14, 1936 |
| 2,093,099 | Rosenberg | Sept. 14, 1937 |
| 2,120,328 | Ferngren | July 14, 1938 |
| 2,255,117 | Helmstaedter | Sept. 9, 1941 |
| 2,262,180 | Hauer | Nov. 11, 1941 |
| 2,422,148 | Uhlig | June 10, 1947 |
| 2,493,953 | Emerson | Jan. 10, 1950 |
| 2,531,539 | Smith | Nov. 28, 1950 |

FOREIGN PATENTS

| | | |
|---|---|---|
| 424,947 | Great Britain | Mar. 4, 1935 |